United States Patent
Johnson

(10) Patent No.: US 9,708,796 B2
(45) Date of Patent: Jul. 18, 2017

(54) HYDRAULIC VALVE

(71) Applicant: CNH Industrial America, LLC, New Holland, PA (US)

(72) Inventor: Thomas Johnson, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 288 days.

(21) Appl. No.: 14/496,024

(22) Filed: Sep. 25, 2014

(65) Prior Publication Data

US 2016/0090716 A1   Mar. 31, 2016

(51) Int. Cl.
| | |
|---|---|
| *E02F 9/22* | (2006.01) |
| *F15B 13/04* | (2006.01) |
| *F16K 11/065* | (2006.01) |
| *F16K 31/12* | (2006.01) |

(52) U.S. Cl.
CPC ........ *E02F 9/2267* (2013.01); *F15B 13/0405* (2013.01); *F15B 13/0417* (2013.01); *F16K 11/0655* (2013.01); *F16K 31/12* (2013.01); *F15B 2013/041* (2013.01)

(58) Field of Classification Search
CPC .......... F15B 11/28; E02F 9/226; E02F 9/2267
See application file for complete search history.

(56) References Cited

U.S. PATENT DOCUMENTS

| | | | |
|---|---|---|---|
| 3,472,127 A | 10/1969 | Scheidt | |
| 4,724,673 A | 2/1988 | Curnow | |
| 4,736,770 A * | 4/1988 | Rousset | F15B 13/0417 137/596 |
| 5,222,426 A * | 6/1993 | Marcon | F15B 11/163 60/420 |
| 6,092,454 A | 7/2000 | Vande Kerckhove | |
| 7,827,787 B2 | 11/2010 | Cherney et al. | |
| 2004/0221714 A1 | 11/2004 | Bitter et al. | |
| 2007/0044650 A1 | 3/2007 | Kuehn et al. | |
| 2007/0074509 A1 | 4/2007 | Zhang et al. | |
| 2007/0245889 A1 | 10/2007 | Breunig et al. | |
| 2009/0000290 A1 | 1/2009 | Brinkman | |
| 2010/0024410 A1 | 2/2010 | Brinkner | |
| 2011/0120297 A1 | 5/2011 | Bitter et al. | |
| 2013/0160879 A1 | 6/2013 | Gabibulayev | |
| 2014/0033689 A1 | 2/2014 | Opdenbosch | |

FOREIGN PATENT DOCUMENTS

| | | | | |
|---|---|---|---|---|
| DE | 102012220863 A1 * | 5/2014 | ............ | E02F 9/2203 |
| EP | 1558849 B1 | 12/2007 | | |
| EP | 1300519 B1 | 12/2010 | | |
| EP | 2365226 A1 | 9/2011 | | |
| IT | EP 2365226 A1 * | 9/2011 | ............ | F15B 11/044 |

* cited by examiner

*Primary Examiner* — Thomas E Lazo
(74) *Attorney, Agent, or Firm* — Dority & Manning

(57) ABSTRACT

A valve for a hydraulic system is provided including a work port channel, a load sense channel, and a tank channel. Additionally, a body cavity extends between the work port channel and the tank channel, and a spool is movably positioned in the body cavity. The body cavity defines an inner surface and the spool defines an outer surface. The inner surface of the body cavity and the outer surface of the spool together define a interface between the body cavity and the spool that extends outwardly from a longitudinal axis, such that an increased pressure differential between the work port channel and a load sense channel increases a sealing force, allowing for a more responsive valve in the hydraulic system with less leakage.

20 Claims, 11 Drawing Sheets

HYDRAULIC VALVE

FIELD OF THE INVENTION

The present disclosure generally relates to a hydraulic valve, or more particularly to a hydraulic valve for a work vehicle.

BACKGROUND OF THE INVENTION

Work vehicles, such as tractors and other agricultural vehicles, often have hydraulic lines, sometimes termed an electro-hydraulic remote, to supply hydraulic power to ancillary equipment, or more particularly to a hydraulic load. Two hydraulic lines are generally used, one to supply hydraulic fluid under pressure to the hydraulic load and the other acts as a return line for the fluid discharged by the hydraulic load. Each of these two lines is connectible by a coupling to a hose leading to a respective side of the hydraulic load.

The hydraulic load may be, e.g., a hydraulic cylinder. In such a case, the hydraulic load may be required to extend a rod, retract the rod, lock it in a fixed position, or allow it to float freely. To achieve this, a five port, four position spool valve may be used. Such a spool valve includes two output ports, two input ports, and a load sensing port. The output ports are connected to opposing sides of the hydraulic load, and the input ports are connected to a hydraulic pump (supply port) and a tank or reservoir (return port). The load sensing port is connected to the return port when the cylinder is locked or floating. When the jack is being extended or retracted, the load sensing port may be connected to the supply port.

A pump or special valve may be provided to allow a pressure difference to be fixed between the supply port and the load sensing port. Accordingly, a load sensing pressure may be developed in the load sensing port indicative of the resistance offered by the load. If the load is low, the pressure measured at the load sensing port will be lower than the pressure at the supply port. However, when the load offers high resistance, the load sensing port pressure may be nearly equal to the pressure at the supply port.

Within the spool, a throttle may be provided in the connection leading from the return port to the respective output port. The throttle connected to the return port provides a resistance for a return path. There needs to be resistance in the return path to allow for the fact that the load does not always offer a positive resistance and can instead operate in, e.g., a draft mode. Supposing for example that the hydraulic cylinder is being used to raise a heavy weight. The force to extend the rod is resisted by the weight being raised and the rod can only extend relatively slowly. However, when the spool valve is moved to a position to retract the rod and lower the weight, instead of opposing the movement of the hydraulic cylinder, the weight will assist it (i.e., a negative resistance). In the absence of some form of hydraulic damping or resistance, the weight may drop too rapidly. The throttle is therefore included in the spool to provide resistance in the return path in order to damp the movement of the rod when it is operating in a draft mode.

However, when driving a load that is offering a positive resistance, there should ideally be no resistance to a return flow leading to the tank. Any resistance to the flow offered will cause a pressure drop and reduce the efficiency of the hydraulic system. In particular, the throttling effect in a return path in the spool valve will result in undesirable energy losses.

Accordingly, a hydraulic system that may provide an alternative path for hydraulic fluid between the tank and hydraulic load with less resistance to increase the system's efficiency would be beneficial. Moreover, a hydraulic valve for such a hydraulic system that could quickly respond to the need to bypass the resistance offered by the spool valve would be particularly useful.

BRIEF DESCRIPTION OF THE INVENTION

Aspects and advantages of the invention are set forth below in the following description, or may be obvious from the description, or may be learned through practice of the invention.

In one exemplary embodiment, a valve is provided for a hydraulic system including a hydraulic load, a fluid storage vessel, a pressure source, a control valve, and a bypass line. The valve is positioned in fluid communication with the bypass line and includes a work port channel configured for fluid connection with one of a first or second chamber of the hydraulic load, a load sense channel configured for fluid connection with a load sense line, and a tank channel configured for fluid connection with the fluid storage vessel of the hydraulic system. The system also includes a body cavity extending between the work port channel and the tank channel along a longitudinal axis, the body cavity defining an inner surface, and a spool movably positioned in the body cavity and defining an outer surface. The inner surface of the body cavity and the outer surface of the spool together define an interface between the body cavity and the spool that extends outwardly from the longitudinal axis such that an increased pressure differential between the work port channel and the load sense channel increases a sealing force.

In another exemplary embodiment, a hydraulic system is provided, the hydraulic system including a hydraulic load defining a first chamber and a second chamber, a fluid storage vessel, a pressure source, and a control valve configured to fluidly connect the fluid storage vessel to one of the first and second chambers and to fluidly connect the pressure source to the other of the first and second chambers. Additionally, the hydraulic system includes a bypass line defining a flow path between the fluid storage vessel and the hydraulic load that bypasses the control valve, the bypass line fluidly connected to a valve. The valve includes a work port channel configured for fluid connection with one of the first or second chambers of the hydraulic load, a load sense channel configured for fluid connection with a load sense line, and a tank channel configured for fluid connection with the fluid storage vessel of the hydraulic system. Additionally, the valve includes a body cavity extending between the work port channel and the tank channel along a longitudinal axis, the body cavity defining an inner surface between the work port channel and the tank channel, and a spool movably positioned in the body cavity and defining an outer surface. The inner surface of the body cavity and the outer surface of the spool together define an interface between the body cavity and the spool that extends outwardly from the longitudinal axis such that an increased pressure differential between the work port channel and the load sense channel increases a sealing force.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
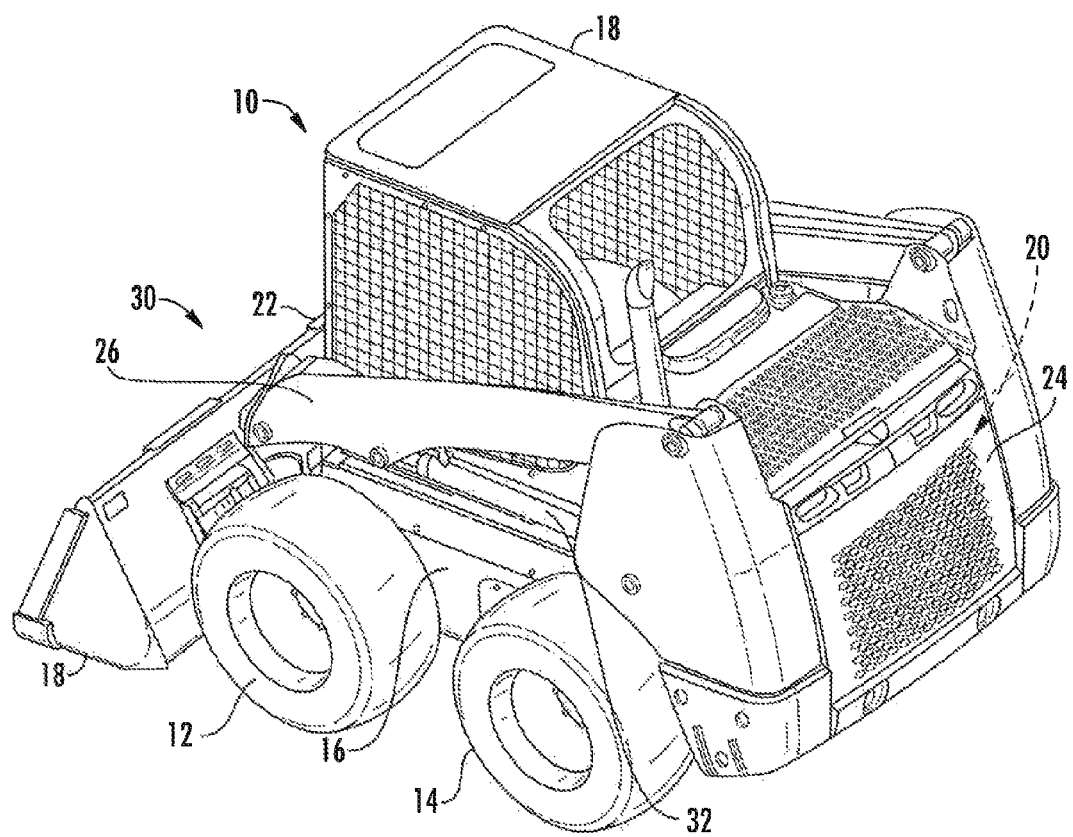
FIG. 1 provides a perspective view of one embodiment of a work vehicle in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a work vehicle 10. As shown, the work vehicle 10 is configured as a skid steer loader. However, in other embodiments, the work vehicle 10 may be configured as any other suitable work vehicle known in the art, such as various agricultural vehicles, front-end loaders, earth-moving vehicles, road vehicles, all-terrain vehicles, off-road vehicles and/or the like.

As shown, the exemplary work vehicle 10 includes a pair of front wheels 12, a pair of rear wheels 14, and a chassis 16 coupled to and supported by the wheels 12, 14. An operator's cab 18 is supported by a portion of the chassis 16 and may house various input devices, such as one or more speed control lever(s) and one or more lift/tilt lever(s) (not shown) for permitting an operator to control the operation of the work vehicle 10. In addition, the work vehicle 10 includes an engine 20 coupled to or otherwise supported by the chassis 16 and positioned generally at a rear end 22 of the work vehicle 10. A grill 24 is positioned at the rear end 22 of the work vehicle 10, proximate to the engine 20 of the work vehicle 10 to allow air flow therethrough.

Still referring to FIG. 1, the exemplary work vehicle 10 additionally includes a pair of loader arms 26 coupled between the chassis 16 and a suitable implement 28 (e.g., a bucket, fork, blade and/or the like) positioned at a front end 30 of the work vehicle 10. A hydraulic system may be provided to actuate the implement 28. For example, the hydraulic system may include hydraulic cylinders coupled between the chassis 16 and the loader arms 26 and between the loader arms 26 and the implement 28 to allow the implement 28 to be raised/lowered and/or pivoted relative to the ground. For example, a raising cylinder 32 is depicted coupled between the chassis 16 and each loader arm 26 for raising and lowering the loader arms 26, thereby controlling the height of the implement 28 relative to the ground. Additionally, a tilt cylinder (not shown) may be coupled between each loader arm 26 and the implement 28 for pivoting the implement 28 relative to the loader arms 26, thereby controlling the tilt or pivot angle of the implement 28 relative to the ground.

It should be appreciated, however, that the work vehicle 10 depicted in FIG. 1 is provided by way of example only, and that in other exemplary embodiments, the work vehicle 10 may have any other suitable configuration.

Referring now to FIGS. 2 through 5 certain aspects of an exemplary hydraulic system 100 are depicted schematically. Although the hydraulic system 100 is described herein with reference to the exemplary work vehicle 10 of FIG. 1, in other exemplary embodiments, the hydraulic system 100 may instead be used with any other suitable work vehicle 10. Further, in still other exemplary embodiments, the hydraulic system 100 described herein could alternatively be used with any other system utilizing hydraulics, such as, for example, hydraulic motors or engines.

The hydraulic system 100 of FIGS. 2 through 5 generally includes a hydraulic load 102, which is depicted as a hydraulic cylinder 104. The hydraulic load 102, or more particularly the hydraulic cylinder 104, defines a first chamber 106 and a second chamber 108. The first chamber 106, which for the exemplary embodiment depicted is a head end of the hydraulic cylinder 104, defines a first chamber pressure $P_1$. Similarly, the second chamber 108, which for the exemplary embodiment depicted is a rod end of the hydraulic chamber 104, defines a second chamber pressure $P_2$. The first chamber pressure $P_1$ may be increased to extend a rod 110 of the hydraulic cylinder 104, increasing an effective length of the hydraulic cylinder 104. Alternatively, the second chamber pressure $P_2$ may be increased to retract the rod 110 and reduce the effective length of the hydraulic cylinder 104. Although the relative pressure increases may be incremental, increasing the pressure in a chamber causes an increased volume of hydraulic fluid to flow into the respective chamber to extend or retract the rod 110.

The hydraulic system 100 also includes a fluid storage vessel. For the embodiment depicted, the fluid storage vessel is a fluid tank 112 defining a fluid tank pressure $P_T$ and configured to receive fluid from one of the first or second chambers 106, 108 of the hydraulic load 102, and a pressure source 114 configured to provide pressurized fluid to one of the first or second chambers 106, 108 of the hydraulic load 102. However, in other exemplary embodiments, the fluid storage vessel may instead be, e.g., a hydraulic accumulator configured to capture the potential energy of the fluid, such as is commonly used in hybrid hydraulic systems known in the art. Additionally, as is depicted, the system 100 includes a fluid tank line 116 fluidly connected with the fluid tank 112, and a pressure source line 118 fluidly connected with the pressure source 114. In certain exemplary embodiments, the pressure source 114 may be a hydraulic pump configured to vary an amount of pressure generated based on, e.g., a user or operator input. Additionally, as used herein, the term "fluid" may refer to any hydraulic fluid known in the art The hydraulic system 100 additionally includes a first work port line 120 and a second work port line 122. The first work port line 120 is fluidly connected to the first chamber 106 of the hydraulic cylinder 104, and similarly, the second work port line is fluidly connected to the second chamber 108 of the hydraulic cylinder 104.

Figure 3:
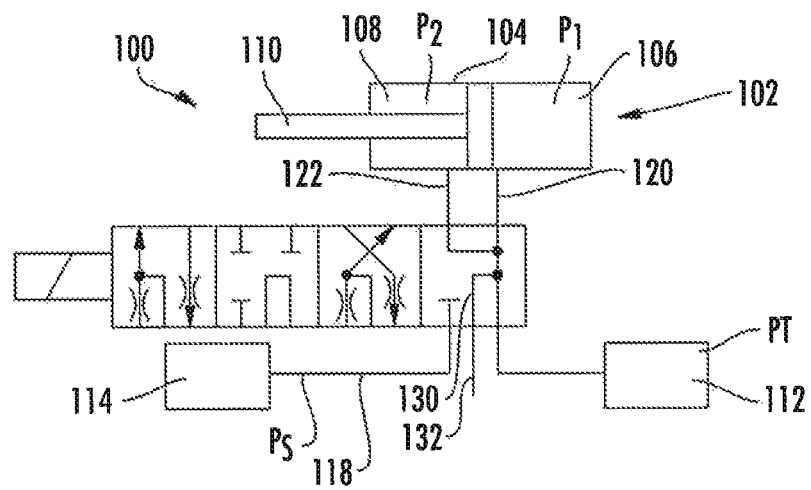
FIG. 3 provides a schematic diagram of certain aspects of the hydraulic system of FIG. 2 with the spool valve in a float position.
Figure 4:
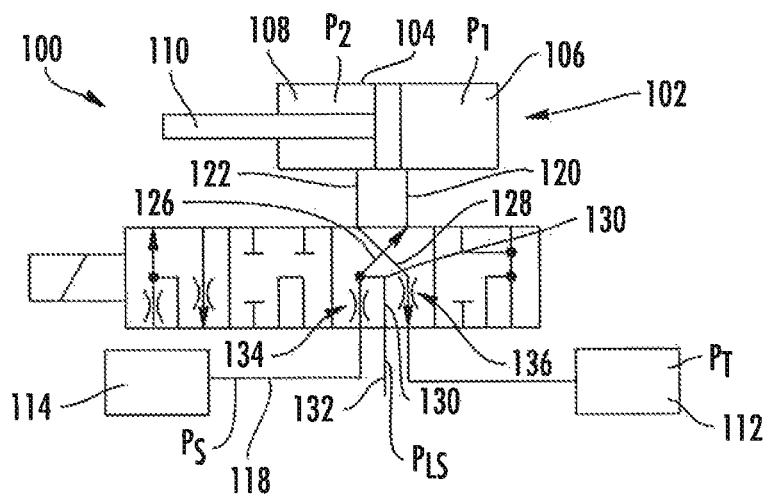
FIG. 4 provides a schematic diagram of certain aspects of the hydraulic system of FIG. 2 with the spool valve in an extend position.
Figure 5:
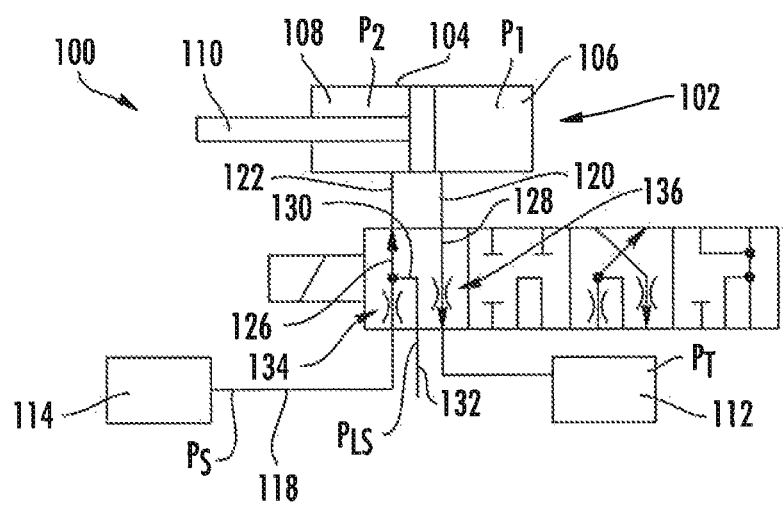
FIG. 5 provides a schematic diagram of certain aspects of the hydraulic system of FIG. 2 with the spool valve in a retract position.

Referring still to FIGS. 2 through 5, the hydraulic system 100 further includes a control valve, which for the embodiment depicted is spool valve 124 movable between various positions. For the exemplary embodiment of FIGS. 2 through 5, the spool valve 124 is a five port, four position spool valve moveable between a locked position (FIG. 2), a float position (FIG. 3), an extend position (FIG. 4), and a retract position (FIG. 5). In certain of these positions, for example, in the extend and retract positions (FIGS. 4-5), the spool valve 124 defines a first connection path 126 that fluidly connects the pressure source 114 to one of the first or second chambers 106, 108 of the hydraulic cylinder 104, and a second connection path 128 that fluidly connects the fluid tank 112 to the other of the first or second chambers 106, 108 of the hydraulic cylinder 104. Moreover, as is discussed below, the spool valve 124 defines a load sense path 130 that may fluidly connect with one of the first or second connection paths 126, 128.

Figure 2:
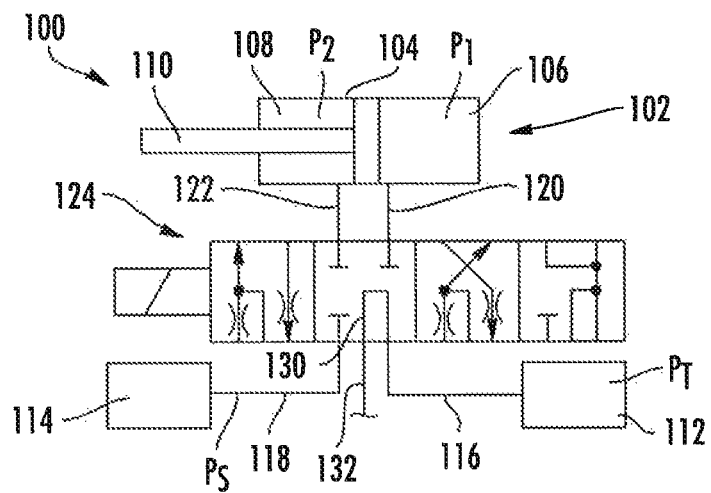
FIG. 2 provides a schematic diagram of certain aspects of a hydraulic system in accordance with the present disclosure, with a spool valve in a locked position.

Referring now specifically to FIG. 2, the spool valve 124 is in the locked position. More particularly, the first and second work port lines 120, 122 are isolated from one another and from the pressure source and tank lines 118, 116. Accordingly, in such an exemplary embodiment, the hydraulic load 102 is locked in its existing position as fluid can neither enter nor escape the first and second chambers 106, 108 of the hydraulic cylinder 104.

By contrast, when the spool valve 124 is in the float position, as is depicted in FIG. 3, the spool valve 124 fluidly connects the first and second work port lines 120, 122. This allows the rod 110 to float freely within the hydraulic cylinder 104. As the working chambers 106, 108 may not have the same cross-sectional area, both chambers 106, 108 are also fluidly connected to the tank 112 via the tank line 116 so that surplus fluid can be discharged to the tank 112 or additional fluid can be drawn from the tank 112.

Referring now to FIG. 4, the spool valve 124 is depicted in the extend position, such that the hydraulic system 100 is configured to extend the rod 110 and, e.g., a loader arm 26 (FIG. 1). Pressurized fluid is supplied from the pressure source 114 to the first chamber 106 of the hydraulic cylinder 104, while fluid from the second chamber 108 is allowed to return to the tank 112. More particularly, pressurized fluid flows from the pressure source 114 at a supply pressure $P_S$, through the first connection path 126 in the spool valve 124, and to the first chamber 106 via the first work port line 120. By contrast, return fluid flows from the second chamber 108 through the second work port line 122, through the second connection path 128 in the spool valve 124, and through the fluid tank line 116 to the fluid tank 112. Such a configuration may cause the rod 110 to move from right to left as viewed and extend the effective length of the hydraulic cylinder 104.

The connections of FIG. 4 are reversed when the spool valve 124 is moved to the retract position depicted in FIG. 5. In this case, pressurized fluid is supplied from the pressure source 114 to the second chamber 108 of the hydraulic cylinder 104, while fluid from the first chamber 106 is allowed to return to the tank 112. More particularly, pressurized fluid flows from the pressure source 114 at the supply pressure $P_S$, through the first connection path 126 in the spool valve 124, and to the second chamber 108 via the second work port line 122. By contrast, return fluid flows from the first chamber 106 through the first work port line 120, through the second connection path 128 in the spool valve 124, and through the fluid tank line 116 to the fluid tank 112. In this way, the rod 110 is caused to retract back into the cylinder 104 from left to right, as viewed, and reduce the effective length of the hydraulic cylinder 104.

Referring generally to FIGS. 2 through 5, the spool valve 124 further defines a load sensing path 130 connected to fluid tank line 116 when the spool valve 124 is the locked position (FIG. 2) or floating position (FIG. 3), and fluidly connected to the first connection path 126 which is, in turn, connected to the pressure source 114, when the spool valve 124 is in the extend position (FIG. 4) or the retract position (FIG. 5). In each of these cases the load sensing path 130 is also fluidly connected to a load sense line 132.

For the embodiment depicted, a load sense pressure $P_{LS}$ may be developed in the load sensing path 130 and in the load sense line 132 indicative of the pressure in the chamber fluidly connected to the pressure source 114. For example, in FIG. 4, the load sense pressure $P_{LS}$ may be representative of the pressure $P_1$ in the first chamber 106, while in FIG. 5, the load sense pressure $P_{LS}$ may be representative of the pressure $P_2$ in the second chamber 108. A pump or other special valve (not shown) may be included to provide such functionality in the spool valve 124. Additionally, the first connection path 126 comprises a throttling valve 134 and the second connection path 128 comprises a throttling valve 136. The throttling valves 134, 136 in the first and second connection paths 126, 128, respectively, may control a flow rate of hydraulic fluid therethrough.

It should be appreciated, however, that in other exemplary embodiments, any other suitable control valve may be included in the hydraulic system 100. For example, in other embodiments, the control valve may be a spool valve only moveable between two or three positions, and may not define one or both of, e.g., the locked position (FIG. 2) or the float position (FIG. 3). Additionally, the control valve may be a poppet type valve, or alternatively may be a spool valve including a spool made of multiple pieces. Moreover, in still other embodiments, the spool valve 124 and hydraulic system 100 may alternatively define any other suitable load sensing configuration capable of defining a load sense pressure representative of a work port pressure. For example, the spool valve 124 may be a six port spool valve defining three input ports and three output ports. In such a configuration, one of the output ports through which throttled fluid flows from the pressure source 114 may be fed back to an input port via a feedback line to determine the routing between the first and second chambers 106, 108 of the hydraulic load 102. In such a configuration, the load sense line 132 may be fluidly connected with the feedback line to determine a resistance on the hydraulic load 102.

Figure 6:
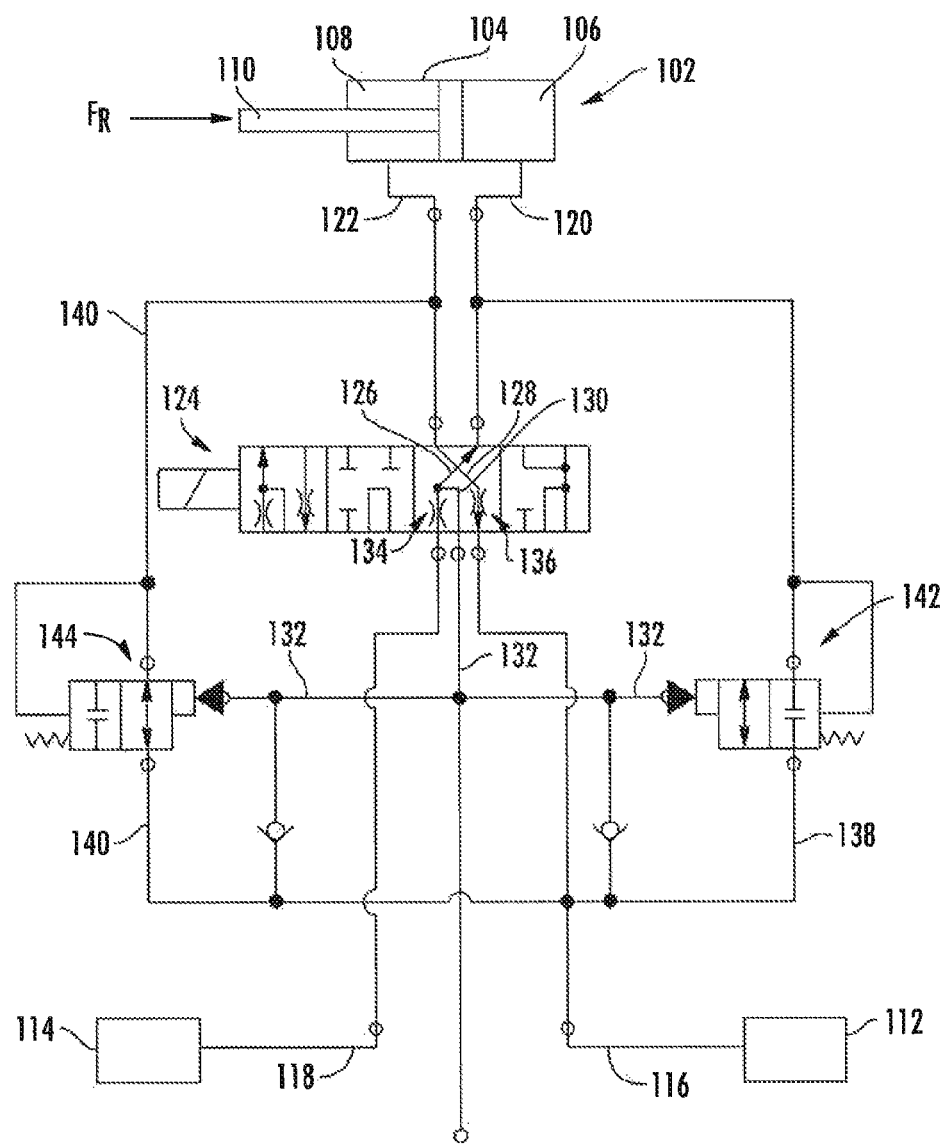
FIG. 6 provides a schematic diagram of certain additional aspects of the hydraulic system of FIG. 2 operating in a resistive extend mode.
Figure 7:
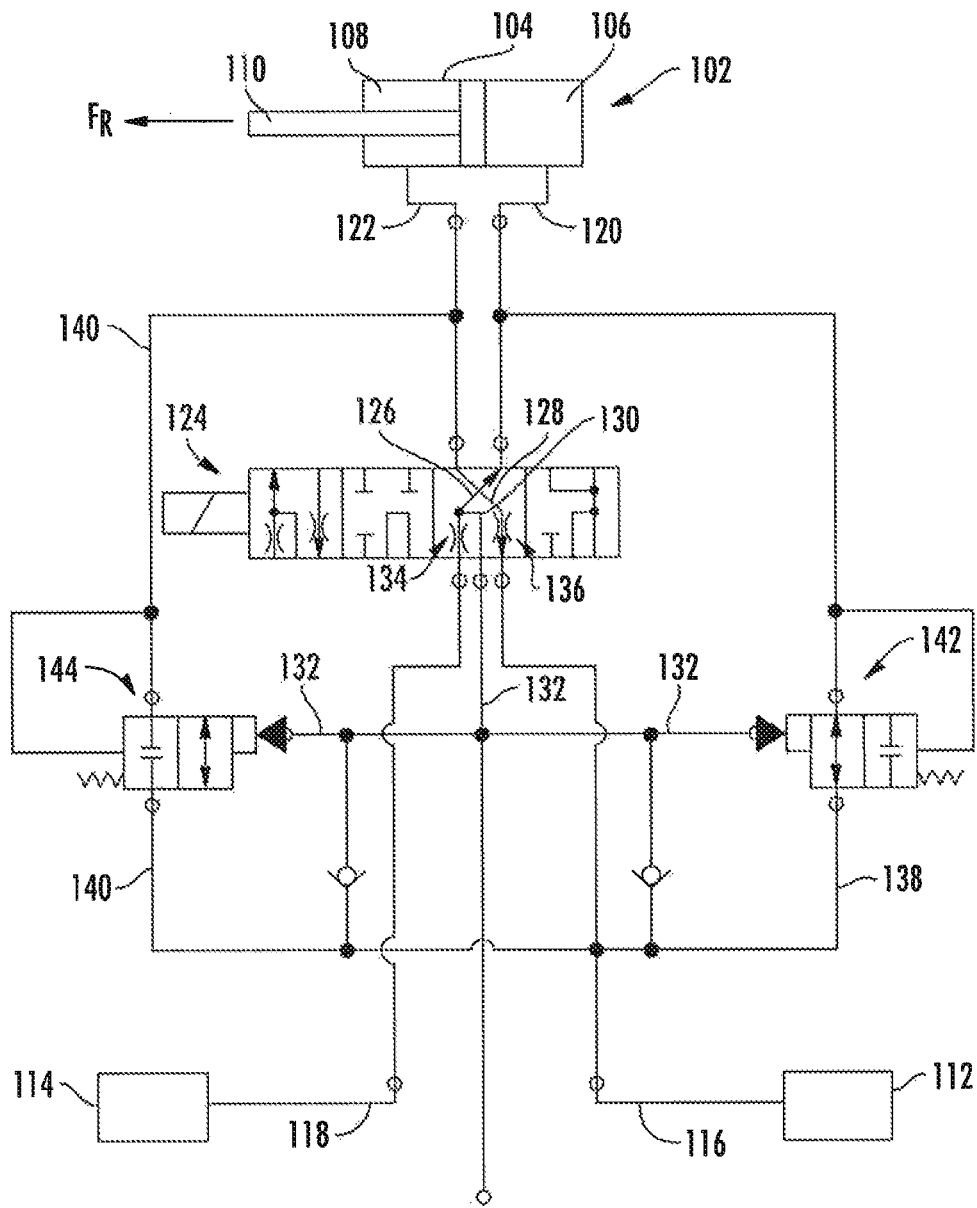
FIG. 7 provides a schematic diagram of certain additional aspects of the hydraulic system of FIG. 2 operating in a float extend mode.

Referring now to FIGS. 6 and 7, a schematic representation of certain aspects of a hydraulic system 100 in accordance with an exemplary embodiment of the present disclosure is provided in greater detail. More particularly, the hydraulic system 100 of FIGS. 6 and 7 depicts the hydraulic system of FIG. 4 with certain additional components, discussed below. FIG. 6 depicts the hydraulic system 100 in a resistive extend mode, and FIG. 7 depicts the hydraulic system 100 in a draft extend mode.

When operating in a resistive extend mode (FIG. 6), i.e., when a resistance force $F_R$ on the rod 110 is positive, the rod 110 attempts to retract under such resistance forces and offers resistance to fluid supplied through first work port line 120 to the first chamber 106. In such a configuration, there may be a relatively large back pressure, in which case there would be no danger of the rod 110 moving too quickly. However, all the fluid returning to the fluid storage vessel, or more particularly to the fluid tank 112, from the second chamber 108 of the hydraulic load 102 through the second work port line 122 would nonetheless encounter resistance if it were to flow through the second connection path 128, i.e., the return connection path, of the spool valve 124. The work done to force the fluid through the throttling valve 136 in the return connection path 128 would unnecessarily reduce the overall efficiency of the hydraulic system 100.

By contrast, however, when operating in a draft extend mode (FIG. 7), i.e., when an amount of resistance force $F_R$ on the rod 110 is negative, the rod 110 would extend on account of such resistance force if the rod 110 were allowed to float. In such a case, it may be necessary for the fluid to be throttled by the throttle valve 136 in the return connection path 128 of the spool valve 124 to prevent the rod 110 from moving too quickly. Therefore, the throttling effect within the return connection path 128 may be necessary when operating in extend draft mode (FIG. 7).

Further, in certain embodiments, the negative resistance force $F_R$ operating on the rod 110 may be large enough to cause the rod 110 to extend under gravitational forces at a dangerously quick rate despite the throttling in the return path 128. The quick extension of the rod 110 can cause the first chamber pressure $P_1$ to drop to below a cavitation threshold such that cavitation may occur in the first chamber 106. Such an effect may, e.g., cause damage to the hydraulic system 100 or make control of the hydraulic system 100 difficult. Accordingly, requiring fluid to travel through the throttling valve 134 in the first connection path 126 of the spool valve 124, i.e., the outgoing connection path, may not allow the fluid to reach the first chamber 106 of the hydraulic cylinder 104 quickly enough to prevent cavitation of the fluid therein.

Accordingly, the hydraulic system 100 depicted in FIGS. 6 and 7 provides an alternative flow path for the fluid between the tank 112 and a chamber of the hydraulic load 102. More particularly, the hydraulic system 100 of FIGS. 6 and 7 provides a supply flow path 126 that has higher resistance to allow load sensing when operating in, e.g., a resistive extension mode (FIG. 6), and an alternative supply flow path having lower resistance when operating in, e.g., a draft extension mode (FIG. 7), to decrease the risk of cavitation. Similarly, the hydraulic system of FIGS. 6 and 7 provides a return flow path 128 that has higher resistance to allow damping when operating in, e.g., a draft extension mode (FIG. 7), and an alternative return flow path having lower resistance when operating in, e.g., a resistive extension mode (FIG. 6), to increase the efficiency of the hydraulic system 100. Furthermore, for the exemplary hydraulic system 100 depicted in FIGS. 6 and 7, the switching between flow paths is automatic and requires no intervention from, e.g., an operator of a work vehicle 10.

The exemplary hydraulic system 100 accordingly includes a first bypass line 138 and a second bypass line 140. The first bypass line 138 defines a flow path that bypasses the spool valve 124 to selectively allow a fluid flow between the first chamber 106 of the hydraulic load 102 and the fluid tank 112. Similarly, the second bypass line 140 defines a flow path that bypasses the spool valve 124 to selectively allow a fluid flow between the second chamber 108 of the hydraulic load 102 and the fluid tank 112. Further, the hydraulic system 100 includes a first bypass and anti-cavitation valve ("BAC valve") 142 positioned in the first bypass line 138 and a second BAC valve 144 positioned in the second bypass line 140.

The first BAC valve 142 is movable between an open position (FIG. 7) and a closed position (FIG. 6). When in the open position, fluid may flow through the first bypass line 138 between the first chamber 106 and the fluid tank 112, and when in the closed position fluid may not flow through the bypass line 138 between the first chamber 106 and the fluid tank 112. For the embodiment depicted, the first bypass line 138, or more particularly, the first BAC valve 142, allows such a flow when a difference between the load sense pressure $P_{LS}$ and the first chamber pressure $P_1$, i.e., the load sense pressure $P_{LS}$ minus the first chamber pressure $P_1$, is greater than a predetermined bypass threshold, and also allows for such a flow when a difference between the fluid tank pressure $P_T$ and the first chamber pressure $P_1$, i.e., the fluid tank pressure $P_T$ minus the first chamber pressure $P_1$, is greater than a predetermined anti-cavitation threshold.

Similarly, the second BAC valve 144 is movable between an open position (FIG. 6) and a closed position (FIG. 7). When in the open position, fluid may flow through the second bypass line 140 between the second chamber 108 and the fluid tank 112, and when in the closed position fluid may not flow through the bypass line 140 between the second chamber 108 and the fluid tank 112. For the embodiment depicted, the second bypass line 140, or more particularly, the second BAC valve 144, allows such a flow when a difference between the load sense pressure $P_{LS}$ and the second chamber pressure $P_2$, i.e., the load sense pressure $P_{LS}$ minus the second chamber pressure $P_2$, is greater than a predetermined bypass threshold, and also allows for such a flow when a difference between the fluid tank pressure $P_T$ and the second chamber pressure $P_2$, i.e., the fluid tank pressure $P_T$ minus the second chamber pressure $P_2$, is greater than a predetermined anti-cavitation threshold.

For each of the embodiments of FIG. 7, the first BAC valve 142 and second BAC valve 144 are each a single valve, as will be discussed below. Accordingly, each of the valves 142, 144, may reduce the required fluid connections to minimize a risk of fluid leakage in the hydraulic system 100.

In certain exemplary embodiments, the predetermined bypass threshold and/or the predetermined anti-cavitation threshold may be zero (0) pounds per square inch ("psi"). However, in other exemplary embodiments, as will be explained in greater detail below, the first bypass line 138 and/or the second bypass line 140 may be biased towards not allowing a flow therethrough such that the predetermined bypass threshold and/or the predetermined anti-cavitation threshold is greater than zero (0) psi. Further, in still other exemplary embodiments, the load sense pressure $P_{LS}$ may, e.g., be scaled down relative to the supply pressure $P_S$ and/or the resistance offered by the hydraulic load 102. Accordingly, in such an exemplary embodiment, the bypass threshold and/or the anti-cavitation threshold may be less than zero (0) psi. Moreover, in certain exemplary embodiments, the predetermined bypass threshold and the predetermined anti-cavitation threshold may vary based on a known ratio of the load sense pressure $P_{LS}$ to the first or second chamber pressures $P_1$, $P_2$, or based on a known ratio of the fluid tank pressure $P_T$ to the first or second chamber pressures $P_1$, $P_2$.

As stated, the hydraulic system of FIG. 6 is depicted in a resistive extension mode. In such a configuration, the load sense pressure $P_{LS}$ may be relatively high, representative of the high resistance on the hydraulic load 102. The second chamber pressure $P_2$ is less than the first chamber pressure $P_1$ (allowing the rod 110 to extend). Additionally, in such a configuration, the fluid tank pressure $P_T$ may be at, e.g., an atmospheric pressure. Therefore, the first BAC valve 142 does not allow a flow of fluid between the first chamber 106 of the hydraulic cylinder 104 and the fluid tank 112, while the second BAC valve 144 does allow for a flow of fluid between the second chamber 108 of the hydraulic cylinder 104 and the fluid tank 112.

More particularly, the difference in the load sense pressure $P_{LS}$ and the first chamber pressure $P_1$ (i.e., $P_{LS}$ minus $P_1$) does not exceed the predetermined bypass threshold, and the difference in the tank pressure $P_T$ and the first chamber pressure $P_1$ (i.e., $P_T$ minus $P_1$) does not exceed the predetermined anti-cavitation threshold. Accordingly, first bypass line 138, or the first BAC valve 142 rather, does not allow a flow of fluid between the first chamber 106 and the fluid tank 112. By contrast, however, the difference in the load sense pressure $P_{LS}$ and the second chamber pressure $P_2$ (i.e., $P_{LS}$ minus $P_2$) is greater than the predetermined bypass threshold. Accordingly, the second BAC valve 144 is automatically moved to the open position to allow fluid to flow from the second chamber 108 through the second bypass line 140 to the tank 112 without encountering the resistance of the throttle valve 136 in the return path 128 of the spool valve 124. Such a configuration may allow for a more efficient hydraulic system 100.

Referring now particularly to FIG. 7, the hydraulic system 100 of FIG. 6 is depicted in a draft extension mode, i.e., where the resistance force $F_R$ is negative so as to assist in the extension of the rod 110. Accordingly, the resistance force $F_R$ causes the pressure $P_2$ in the second chamber 108 to increase relative to the pressure $P_1$ in first chamber 106. Additionally, the load sense pressure $P_{LS}$ decreases, representative of the decreased resistance on the hydraulic load 102. The tank pressure $P_T$, however, may remain at, e.g., an atmospheric pressure. Accordingly, as the second chamber pressure $P_2$ is now greater than the load sense pressure $P_{LS}$ (and is still greater than the tank pressure $P_T$), the second valve 144 is automatically moved to the closed position, requiring the fluid to flow from the second chamber 108 through the return connection path 128 in the spool valve 124 where throttling is provided.

Further, for the exemplary embodiment depicted the negative resistance force $F_R$ is sufficiently large such that the pressure source 114 is not able to provide pressurized fluid to the first chamber 106 quickly enough to keep up with an extension of the rod 110. Accordingly, the tank pressure $P_T$ is now greater than the first chamber pressure $P_1$, such that the first BAC valve 142 is moved to the open position, and fluid travels from the tank 112 through the first bypass line 138 and the first BAC valve 142 to the first chamber 106. Such a configuration may allow for a low resistance fluid flow from the tank 112 to the first chamber 106 to increase the first chamber pressure $P_1$ (or prevent a dangerously low first chamber pressure $P_1$) and reduce a risk of cavitation in the first chamber 106.

Although the operation of the first and second bypass lines 138, 140 and corresponding first and second BAC valves 142, 144 positioned therein are described with the spool valve 124 in the extend mode, the first and second bypass lines 138, 140 may operate similarly, when the spool valve 124 is, e.g., in a retract mode (see FIG. 5).

It should be appreciated that the hydraulic system 100 depicted in FIGS. 6 and 7 and described herein is provided by way of example only. In other exemplary embodiments, the hydraulic system 100 may have any other suitable configurations. For example, in other exemplary embodiments, the system 100 may only include a single bypass line and BAC valve. In such an exemplary embodiment, the bypass line may be selectively in fluid communication with one or both of the first and second chambers 106, 108 of the hydraulic load 102. Further, in still other exemplary embodiments, the first and/or second BAC valves 142, 144 may be comprised of a pair of separate valves with one providing for fluid flow from a chamber of the hydraulic load 102 to the tank 112 when the difference in the chamber pressure and the load sense pressure $P_{LS}$ exceeds a predetermined threshold, and the other valve allowing for the flow of fluid from the tank 112 to the chamber of the hydraulic load 102 when the difference in the tank pressure $P_T$ and chamber pressure exceeds a predetermined threshold. The bypass line may define a portion of parallel-configured flow paths to accommodate the dual valves. Moreover, in other embodiments, other configurations may be provided for the bypass lines 138, 140. For example, in other exemplary embodiments, one or both of the first and second bypass lines 138, 140 may be connected directly to the first or second chamber 106, 108 of the hydraulic cylinder 104, and/or to the fluid tank 112. Furthermore, as previously stated, in still other embodiments, the fluid storage vessel may not be a fluid tank at, e.g., atmospheric pressure. By contrast, in other embodiments, the fluid storage vessel may instead be a hydraulic accumulator, such as is used in hybrid hydraulic systems, to capture potential energy of the fluid.

Figure 8:
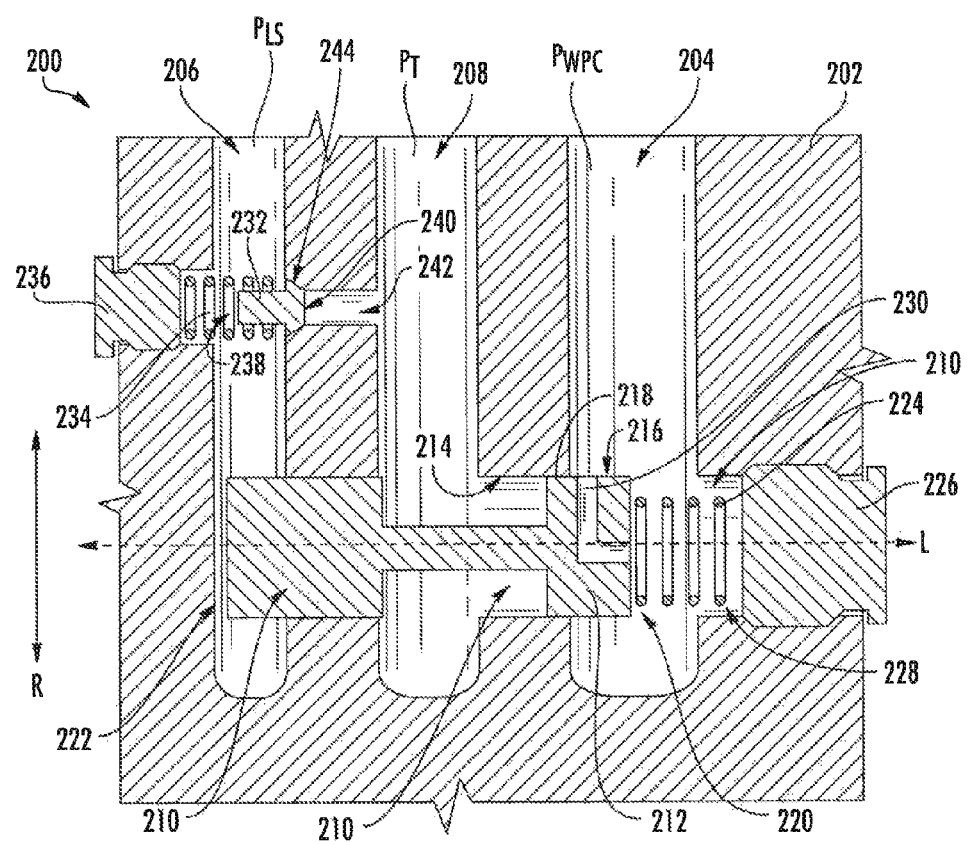
FIG. 8 provides a cross-sectional view of a bypass and anti-cavitation valve in accordance with an exemplary embodiment of the present disclosure with a spool in a first position.
Figure 9:
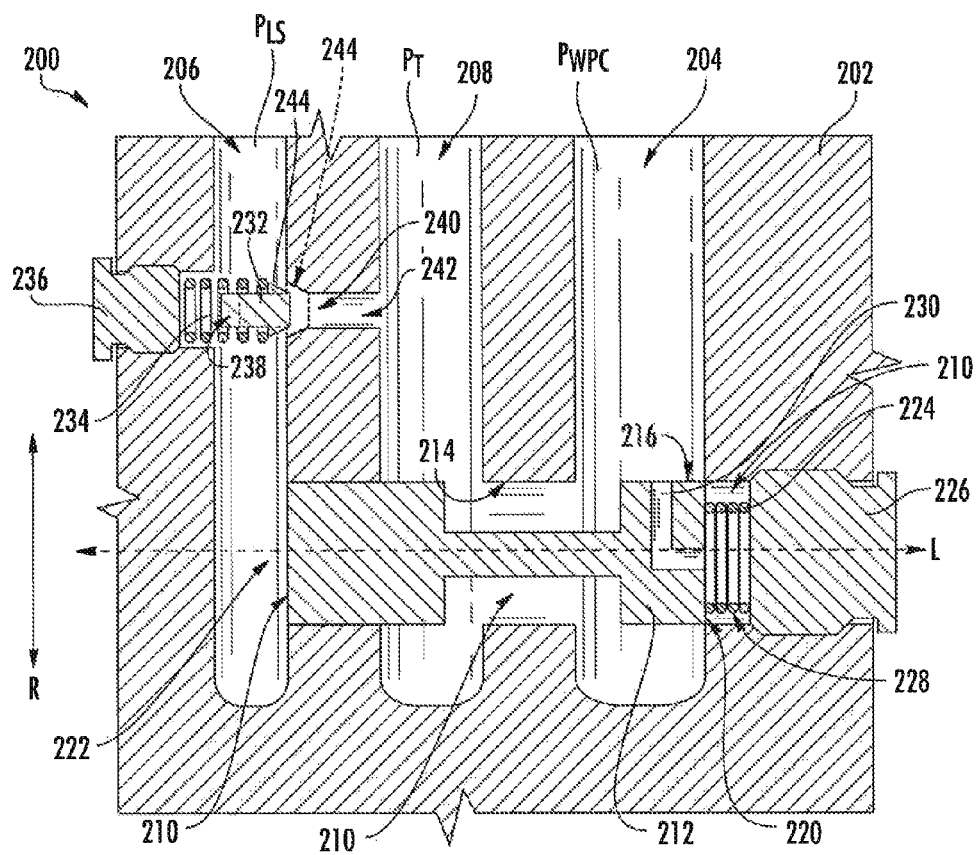
FIG. 9 provides a cross-sectional view of the exemplary bypass and anti-cavitation valve of FIG. 8 with the spool in a second position.

Referring now to FIGS. 8 and 9, a cross-sectional view of a BAC valve 200 in accordance with an exemplary embodiment of the present disclosure is provided. FIG. 8 depicts the BAC valve 200 in a closed position and FIG. 9 depicts the BAC valve 200 in an open position. The BAC valve 200 of FIGS. 8 and 9 is discussed as being configured as the first BAC valve 142, described above. However, in other exemplary embodiments, the BAC valve 200 of FIGS. 8 and 9 may instead be configured as, e.g., the second BAC valve 144, or alternatively as a BAC valve in any other suitable hydraulic system 100.

As depicted, the valve 200 generally includes a valve body 202, the valve body 202 defining a work port channel 204 defining a work port channel pressure $P_{WPC}$ and configured for fluid connection with the first chamber 106 of the hydraulic load 102 (see FIGS. 6 and 7). In certain embodiments, the work port channel 204 may be fluidly connected to the first work port line 120 via bypass line 138, or alternatively may be directly fluidly connected to the first chamber 106 of the hydraulic load 102 via a separate or dedicated fluid line. The valve 200 additionally includes, or more particularly, the valve body 202 additionally defines, a load sense channel 206 and a tank channel 208. The load sense channel 206 defines a load sense channel pressure $P_{LS}$, which, as discussed above, may be indicative of a resistance offered by the hydraulic load 102, i.e., a back pressure, and is configured for fluid connection with the load sense line 132. The tank channel 208 defines a tank channel pressure $P_T$ and is configured for fluid connection with, e.g., the fluid tank 112 of the hydraulic system 100.

The exemplary valve 200 additionally includes a passage or body cavity 210 defined in the valve body 202 extending along a longitudinal axis L between the work port channel 204 and the tank channel 208. Moreover, for the embodiment depicted, the body cavity 210 further extends along the longitudinal axis L to the load sense cavity 206.

Further, the valve 200 includes a spool 212 positioned in the body cavity 210 also extending along the longitudinal axis L. The spool 212 is moveable between a first position and a second position. For the embodiment depicted, the first position corresponds with a closed position of the valve 200 (FIG. 8), in which the work port channel 204 and the tank channel 208 are not fluidly connected, and the second position corresponds to an open position of the valve 200 (FIG. 9), in which the work port 204 channel and the tank channel 208 are fluidly connected via the body cavity 210.

The body cavity 210 may define a cylindrical shape along the longitudinal axis L and the spool 212 may define a similar cylindrical shape along the longitudinal axis L. Moreover, for the embodiment depicted, the body cavity 210 defines an inner surface 214 that extends parallel to the longitudinal axis L, and the spool 212 similarly defines an outer surface 216 that extends parallel to the longitudinal axis L. The inner surface 214 of the body cavity 210 and the outer surface 216 of the spool 212 together define an interface 218 that prevents a flow of fluid between the tank channel 208 and the work port channel 204 when the valve 200 is in the closed position (FIG. 8). Although not depicted, the interface 218 may additionally include one or more seals, such as O-rings, to prevent a flow of fluid in the closed position.

It should be appreciated, however, that other exemplary embodiments of the present disclosure may have any other suitable geometry for the body cavity 210 and/or the spool 212. For example, in other embodiments, the body cavity 210 and spool 212 may each instead define a squared cross-sectional shape, or may define a tapered or slanted interface 218 relative to the longitudinal axis L, as discussed below with reference to FIGS. 12 through 15.

Referring still to FIGS. 8 and 9, the spool 212 extends between a first longitudinal 220 end and a second longitudinal end 222. The first longitudinal end 220 is exposed to the work port channel pressure $P_{WPC}$ and the second longitudinal end 222 is exposed to the load sense channel pressure $P_{LS}$. Additionally, the first longitudinal end 220, the valve body 202, and the plug 226 together define a work port cavity 228 proximate to the first longitudinal end 220. A work port bore 230 is defined within the spool 212 to fluidly connect the work port channel 204 and the work port cavity 228 when, e.g., the spool 212 is in the open position (FIG. 9), to allow the work port channel pressure $P_{WPC}$ to be transferred to the work port cavity 228 and be applied to the first longitudinal end 220 of the spool. Such a configuration may assist in moving the spool 212 to the closed position if the load sense channel pressure $P_{LS}$ changes when the spool 212 is in the open position.

Referring still to FIGS. 8 and 9, the exemplary valve 200 additionally includes a passage 242 for fluidly connecting the load sense channel 206 and the tank channel 208 when the difference in the tank channel pressure $P_T$ and the load sense channel pressure $P_{LS}$, i.e., $P_T$ minus $P_{LS}$, exceeds a predetermined threshold. Such a threshold may be less than the bypass and/or anti-cavitation threshold. When the difference in the tank channel pressure $P_T$ and the load sense channel pressure $P_{LS}$ exceeds the predetermined threshold, fluid in the tank channel 208 may travel through the passage 242 into the load sense channel 206 to increase the load sense channel pressure $P_{LS}$ and assist in moving the spool 210 into the open position to allow for a flow of fluid between the work port channel 204 and the tank channel 208. Such a flow may reduce a risk of cavitation in the hydraulic load 102.

More particularly, for the embodiment depicted, the passage 242 is a cavity separate from the body cavity 210, and the valve 200 further includes a check valve 232 positioned in or adjacent to the passage with a biasing element 234 configured to bias the check valve 232 towards a closed position. For the embodiment depicted, the biasing element 234 is a spring configured to interact with a plug 236 to provide the biasing force. However, in other embodiments, the check valve 232 may instead be biased towards a closed position by, e.g., increasing an effective area of a second end 238 of the check valve 232 (exposed to the load sense channel pressure $P_{LS}$) relative to an effective area of a first end 240 of the check valve 232 (exposed to the tank channel pressure $P_T$). Notably, the check valve 232 and passage 242 define a tapered interface 244 such that the fluid may flow from the tank channel 208 to the load sense channel 206 immediately when the pressure difference exceeds the predetermined threshold. The tapered interface 244 may be configured similar to the tapered interfaces 414, 414' described below with reference to FIGS. 12 through 15. Notably, such a tapered interface may allow for a more response valve 200, efficiently responding to the fluid pressures to reduce a risk of cavitation.

For the exemplary embodiment depicted, the first longitudinal end 220 defines an effective area that is approximately equal to an effective area defined by the second longitudinal end 222. Accordingly, in order to bias the spool 212 towards the first position (FIG. 8), the exemplary valve 200 of FIGS. 8 and 9 additionally includes a biasing element 224 positioned adjacent to the first longitudinal end 220 of the spool 212. The biasing element 224 interacts with a plug 226 to provide a biasing force on the spool 212. Although the biasing element 224 is depicted in FIGS. 8 and 9 as a spring, in other exemplary embodiments, the spool 212 may additionally or alternatively be biased toward the first position by defining a larger effective area at the first longitudinal end 220 of the spool 212 than at the second longitudinal end 222 of the spool 212. As used herein, the term "effective area" means the cross-sectional area along a radial direction R of the body cavity 210. In such an exemplary embodiment, the spool 212 may therefore define a predetermined bypass and anti-cavitation threshold that varies based on an absolute pressure of the work port channel pressure $P_{WPC}$, i.e., the work port channel pressure $P_{WPC}$ minus the load sense channel pressure $P_{LS}$ and/or minus the tank channel pressure $P_T$. Accordingly, in such an embodiment, the predetermined bypass threshold may be a ratio of the load sense pressure $P_{LS}$ and/or the tank channel pressure $P_T$ to the work port channel pressure $P_{WPC}$.

As depicted in FIG. 9, when the difference in the load sense channel pressure $P_{LS}$ and the work port channel pressure $P_{WPC}$ exceeds a predetermined threshold (as may be adjusted by the biasing element), the spool 212 is moved within the body cavity 210 to the second position. Notably, when the check valve 232 in the passage 230 between the tank channel 208 and the load sense channel 206 is closed, as is shown in phantom in FIG. 9, yet the spool 212 is in the second position, the valve 200 is allowing bypass from, e.g., the first chamber 106 of the hydraulic load 102 to the tank 112 to increase the efficiency of the hydraulic system 100. By contrast, however, when the check valve 232 in the passage 230 between the tank channel 208 and the load sense channel 206 is opened, as is depicted in FIG. 9, and the spool 212 is in the second position, the valve 200 is allowing bypass from, e.g., the tank 112 to the first chamber 106 of the hydraulic load 200 to reduce a risk of cavitation. In such a configuration, the fluid tank pressure $P_T$ (which is greater than the load sense pressure $P_{LS}$) is effectively acting on the second longitudinal end 222 of the spool 212 to move into the second position.

Figure 10:
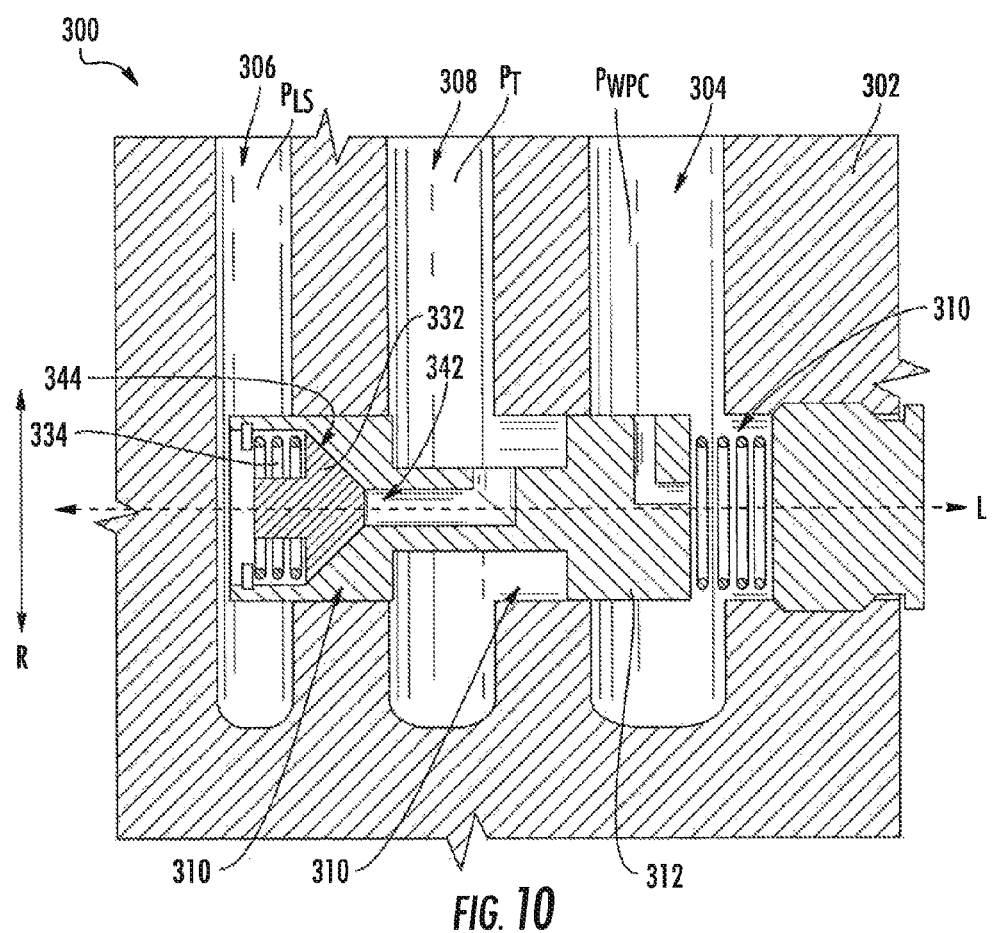
FIG. 10 provides a cross-sectional view of a bypass and anti-cavitation valve in accordance with another exemplary embodiment of the present disclosure with a spool in a first position.
Figure 11:
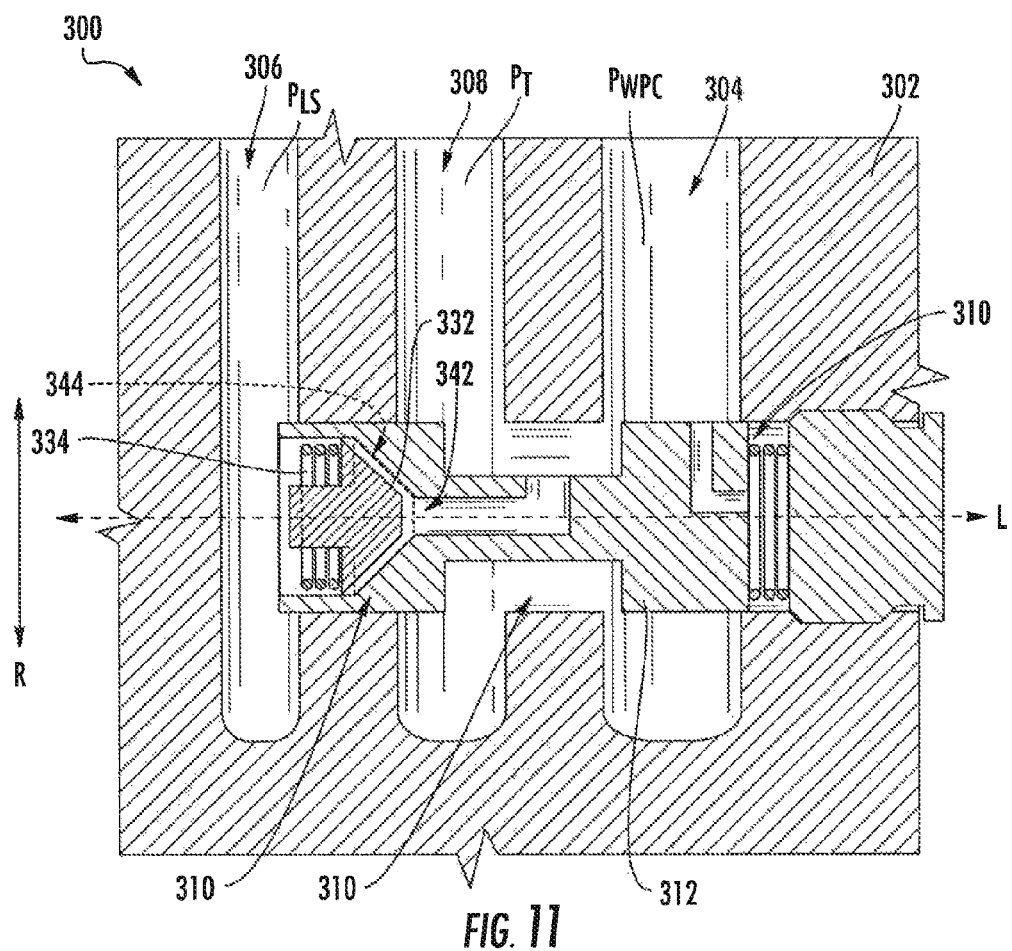
FIG. 11 provides a cross-sectional view of the exemplary bypass and anti-cavitation valve of FIG. 10 with the spool in a second position.

Referring now to FIGS. 10 and 11 a BAC valve 300 in accordance with another exemplary embodiment of the present disclosure is provided. FIG. 10 depicts the BAC valve 300 in a closed position and FIG. 11 depicts the BAC valve 300 in an open position. The BAC valve 300 of FIGS. 10 and 11 is also discussed as being configured as the first BAC valve 142, described above with reference to FIGS. 6 and 7. However, in other exemplary embodiments, the BAC valve 300 of FIGS. 10 and 11 may instead be configured as, e.g., the second BAC valve 144, or alternatively as a BAC valve in any other suitable hydraulic system 100.

The exemplary valve 300 depicted in FIGS. 10 and 11 is configured similar to the exemplary valve 200 of FIGS. 8 and 9. For example, the valve 300 of FIGS. 10 and 11 includes a valve body 302 defining a work port channel 304, a tank channel 306, and a load sense channel 308. The load sense channel 308 defines a load sense channel pressure $P_{LS}$ and is fluidly connected to the load sense line 132 of the hydraulic system 100 of FIGS. 6 and 7. Similarly, the tank channel 308 defines a tank channel pressure $P_T$ and is fluidly connected to, e.g., the fluid tank 112 of the hydraulic system 100 of FIGS. 6 and 7, and the work port channel 304 defines a work port channel pressure $P_{WPC}$ and is fluidly connected with the first chamber 106 of the hydraulic load 102 in the system 100 of FIGS. 6 and 7. Moreover, the valve 300 of FIGS. 10 and 11 includes a body cavity 310 extending along a longitudinal axis L with a spool 312 positioned therein and a passage 342 fluidly connecting the load sense channel 306 and the tank channel 308 when a difference in the tank channel pressure $P_T$ and the load sense channel pressure $P_{LS}$ (i.e., $P_T$ minus $P_{LS}$) is greater a predetermined threshold.

However, for the exemplary embodiment of FIGS. 10 and 11, the passage 342 is instead configured as a bore defined in the spool 312 between the tank channel 308 and the load sense channel 306. The bore defined in the spool 312 additionally includes a check valve 332 positioned in the bore, with a biasing element 334 biasing the check valve 332 towards a closed position. As in the embodiment of FIGS. 8 and 9, the check valve 332 and passage 342 together define a tapered interface 344 relative to the longitudinal axis L.

A BAC valve in accordance with the present disclosure, such as one of the first or second BAC valves 142, 144 of FIGS. 6 and 7, the BAC valve 200 of FIGS. 8 and 9, or the BAC valve 300 of FIGS. 10 and 11, may allow for a more efficient hydraulic system 100 by allowing the return fluid to bypass a throttling valve 136 in the return fluid passage 128 of the spool valve 124 (see FIGS. 6 and 7). Additionally, such a BAC valve may reduce a risk of damage to the system 100 from cavitation in, e.g., the first and/or second chamber 106, 108 of the hydraulic load 102 by allowing fluid from the tank 112 to flow to the first and/or second chamber 106, 108 of the hydraulic cylinder 104 more quickly (i.e., with less resistance) when the difference in the tank pressure $P_T$ and first and/or second chamber pressure $P_1$, $P_2$ exceeds a predetermined threshold. Additionally, such a valve may provide smooth transitions between opened and closed positions when necessary for safety or specific working conditions. Moreover, as is depicted, these features (i.e., bypass and anti-cavitation functions) may be combined into a single valve such that an opportunity for leakage of fluid may be minimized. Such a configuration may be important when dealing with high-pressure hydraulic systems, such as the hydraulic system 100 described above. More particularly, the BAC valve may provide these desired features while only requiring three fluid connections—e.g., an input (bypass line connected to a work port line), an output (bypass line connected to the tank), and a connection to the load sense line 132.

Figure 12:
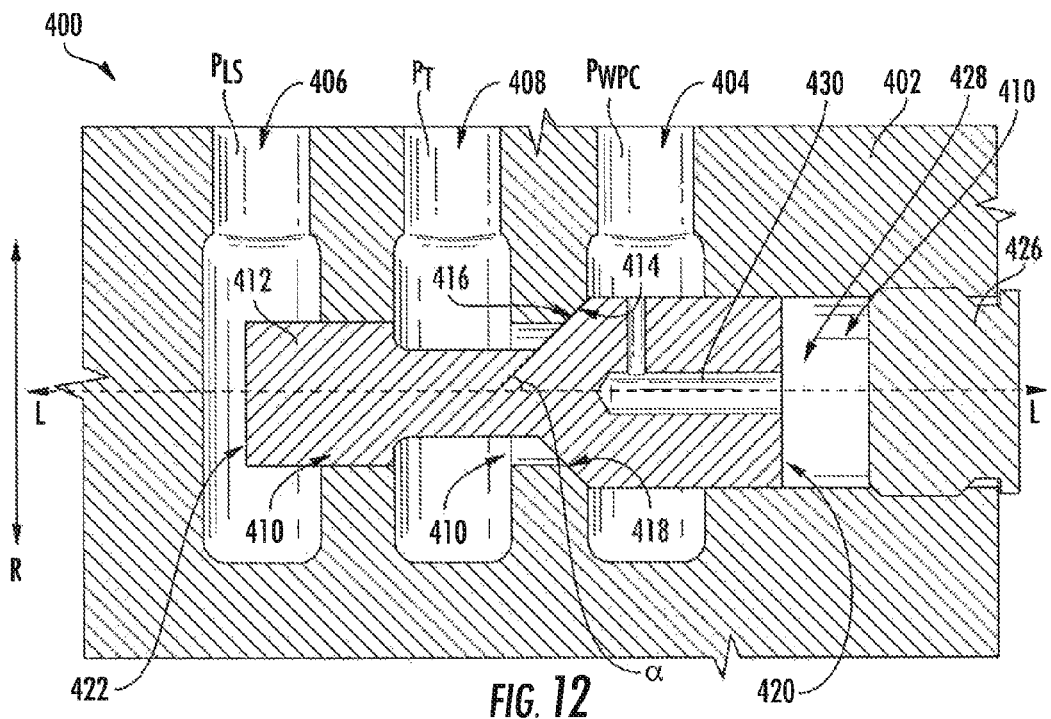
FIG. 12 provides a cross-sectional view of a valve in accordance with yet another exemplary embodiment of the present disclosure with a spool in a first position.
Figure 13:
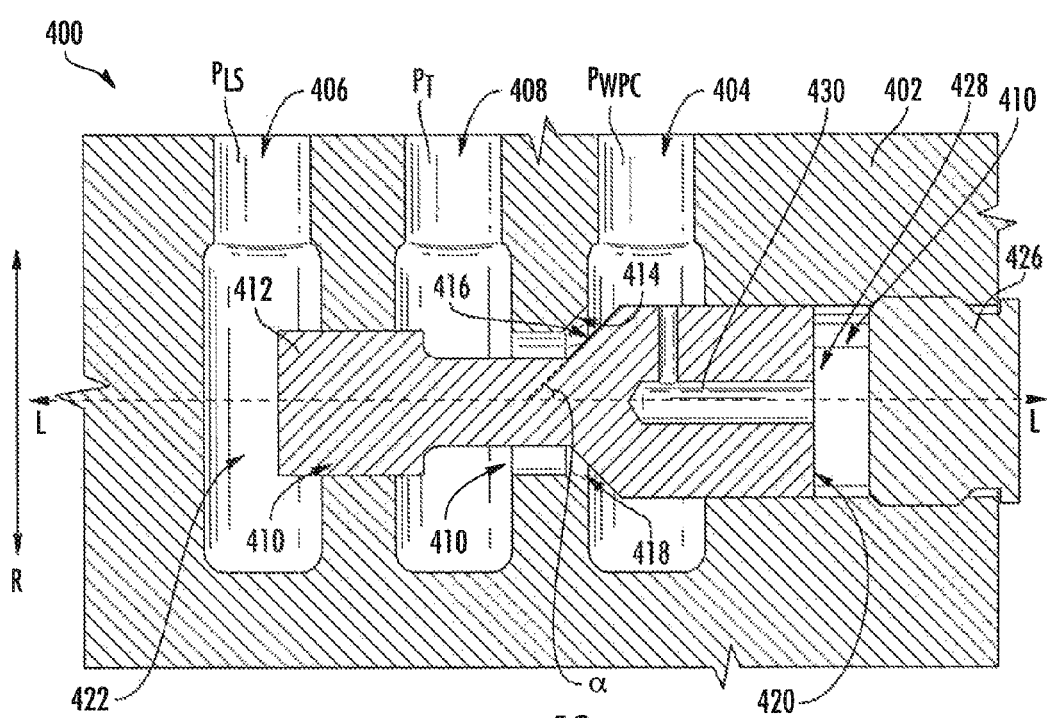
FIG. 13 provides a cross-sectional view of the exemplary valve of FIG. 12 with the spool in a second position.

Referring now to FIGS. 12 and 13, a valve 400 for a hydraulic system 100 in accordance with another exemplary embodiment of the present disclosure is provided. As will be described in greater detail below, FIG. 12 depicts the exemplary valve 400 in a closed position and FIG. 13 depicts the exemplary valve 400 in an open position. The exemplary valve 400 of FIGS. 12 and 13 may be incorporated in the hydraulic system 100 described above with reference to FIGS. 6 and 7, or more particularly, the valve may be positioned in the first bypass line 138 and/or the second bypass line 140 described above.

The exemplary valve depicted includes a valve body 402 defining a work port channel 404, a load sense channel 406, and a tank channel 408. The work port channel 404 defines a work port channel pressure $P_{WPC}$ and is configured for fluid connection with one of the first or second chambers 106, 108 of the hydraulic load 102. For example, the work port channel 404 may be in fluid communication with the first or second work port lines 120, 122 via the bypass lines 138, 140, respectively, or alternatively, the work port channel 404 may be in fluid communication with the first or second chamber 106, 108 of the hydraulic load 102 through, e.g., a separate and/or dedicated fluid line.

Similarly, the load sense channel 406 defines a load sense channel pressure $P_{LS}$ and is configured for fluid connection with the load sense line 132, and the tank channel 408 defines a tank channel pressure $P_T$ and is configured for fluid connection with, e.g., the fluid tank 112 of the hydraulic system 100. As discussed above, the load sense channel pressure $P_{LS}$ may be indicative of a resistance on the hydraulic load 102.

The exemplary valve of FIGS. 12 and 13 further defines a passage or body cavity 410 extending along a longitudinal axis L between the work port channel 404 and the tank channel 408, and further includes a spool 412 movably positioned in the body cavity 410 along the longitudinal axis L. The spool 412 is movable between a first position corresponding to the closed position of the valve 400 (FIG.

12), and a second position corresponding to the open position of the valve 400 (FIG. 13).

Additionally, for the embodiment depicted, the body cavity 410 defines an inner surface between the work port channel 404 and the tank channel 408, and the spool 412 defines an outer surface. The inner surface of the work port channel 404 and the outer surface of the spool 412 define an interface between the body cavity 410 and the spool 412 that extends outwardly from the longitudinal axis L such that an increased pressure differential between the work port channel 404 and the load sense channel 406 increases a sealing force on the interface. More particularly, for the embodiment depicted, the inner surface of the body cavity 410 is a tapered inner surface 414 and the outer surface of the spool 412 is a tapered outer surface 416, such that the interface is a tapered interface 418 defined by the body cavity 410 and spool 412 between the body cavity 410 and the spool 412.

The tapered interface 418 may define any suitable angle with respect to the longitudinal axis L of the body cavity 410. For example, the tapered interface 418 may define an angle, α, between 20 and 70 degrees, or between 30 and 60 degrees. More particularly, for the exemplary embodiment depicted, the tapered interface 418 defines an angle, α, of approximately 45 degrees with respect to the longitudinal axis L. As used herein, terms of approximation, such as "approximately" or "substantially" refer to being within a 10% margin of error.

It should be appreciated, however, that in other exemplary embodiments, the tapered inner surface 414 of the body cavity 410 may define an angle relative to the longitudinal axis L that is greater than or less than an angle defined by the tapered outer surface 416 of the spool 412 and the longitudinal axis L. For example, in certain embodiments, the tapered inner surface 414 may define an angle with the longitudinal axis L greater than an angle the tapered outer surface 416 defines with the longitudinal axis L. Such a configuration may, e.g., allow for a seal or gasket to be positioned in the tapered interface 418 on one or both of the tapered inner surface 414 and tapered outer surface 416. Further, in other exemplary embodiment, the interface may not be the tapered interface 418, and instead any other suitable configuration may be provided such that the interface extends outwardly from the longitudinal axis L. For example, in other embodiments, the interface may be a rounded or curved interface, could include a single tapered surface, or could be a "tooth" style interface.

When the spool 412 is in the first position, the tapered interface 418 prevents a flow of fluid between the tank channel 408 and the work port channel 404. One or more seals or gaskets, such as an O-ring, may be provided on or embedded in the tapered inner surface 414 and/or the tapered outer surface 416 to assist in preventing such a flow. By contrast, when the spool 412 is in the second position, the tapered interface 418 allows for a flow of fluid between the tank channel 408 and the work port channel 404. For the embodiment of FIGS. 12 and 13, the spool 412 is moved to the second position when the difference in the load sense pressure $P_{LS}$ and work port channel pressure $P_{WPC}$, i.e., $P_{LS}$ minus $P_{WPC}$, exceeds a predetermined threshold. The predetermined threshold may be 0 psi, such that the spool 412 is moved to the second position whenever the load sense pressure $P_{LS}$ exceeds the work port channel pressure $P_{WPC}$, or alternatively may be a pressure difference greater than zero (0) psi. For example, the spool 412 depicted in FIGS. 12 and 13 is biased towards the first position such that the load sense pressure $P_{LS}$ must exceed the work port channel pressure $P_{WPC}$ by a certain threshold to move the spool 412 to the second position. The biasing is achieved by the relative surface areas of the spool 412. Specifically, the spool 412 extends between a first longitudinal end 420 and a second longitudinal end 422. The first longitudinal end 420 is exposed to the work port channel pressure $P_{WPC}$ and the second longitudinal end 422 is exposed to the load sense pressure $P_{LS}$. The first longitudinal end 420 defines a first effective surface area and the second longitudinal end 422 defines a second effective surface area. For the embodiment depicted, the first effective surface area is greater than the second effective surface area to effectuate the biasing of the spool 412 towards the first position. It should be appreciated, however, that in other exemplary embodiments a biasing element, such as a spring, may additionally or alternatively be provided.

Referring still to the exemplary embodiment of FIGS. 12 and 13, the first longitudinal end 420, the valve body 410, and a plug 426 together define a work port cavity 428. Additionally, a work port bore 430 is defined within the spool 410 to fluidly connect the work port channel 404 and the work port cavity 428 to allow the work port channel pressure $P_{WPC}$ to be transferred to the work port cavity 428. Additionally, for the embodiment depicted, the body cavity 410 further extends along the longitudinal axis L to the load sense channel 406 and the second end 422 of the spool 412 is positioned within the load sense channel 406. It should be appreciated, however, that in other exemplary embodiments, the valve 400 may not define the work port cavity 428, and instead the work port channel 404 and spool 412 may be sized such that the first longitudinal end 420 of the spool 412 is exposed to the work port cavity pressure $P_{WPC}$ in the first and second positions.

Referring still to the exemplary embodiment of FIGS. 12 and 13, the tank channel 408 is depicted positioned between the load sense channel 406 and the work port channel 404, and the tapered interface 418 tapers radially outwardly along a radial direction R from the longitudinal axis L towards the work port channel 404. The valve of FIGS. 12 and 13 may therefore allow for a flow of fluid between the work port channel 404 to the tank channel 408 immediately as the tapered interface 418 begins to open when the valve 400 moves from the closed position to the open position. Accordingly, such a configuration may allow for a more responsive valve configuration. Such a quick response to fluid pressures in the valve 400, allowed by the configuration of the interface between the inner surface of the cavity 410 and the outer surface of the spool 412 (e.g., tapered interface 418), may allow the hydraulic system 100 to operate more efficiently. Notably, however, such a configuration may further provide for a more effective seal when in the closed position, as the greater the pressure difference between the work port channel pressure $P_{WPC}$ and the load sense pressure $P_{LS}$, the greater a sealing force applied on the spool 412 and the interface (e.g., tapered interface 418).

Figure 14:
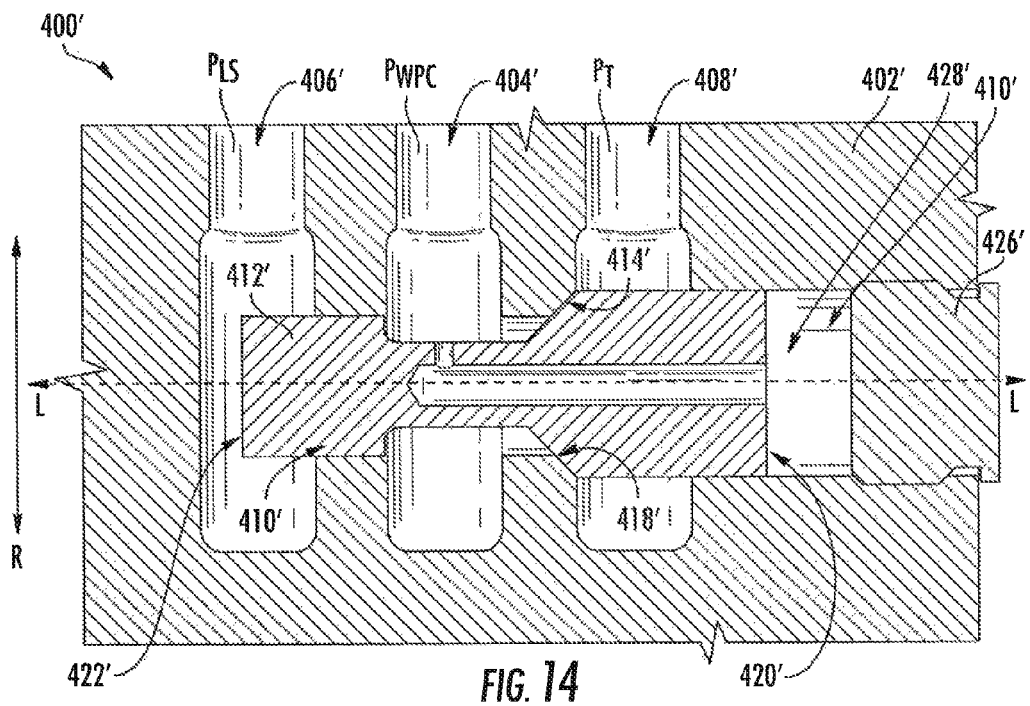
FIG. 14 provides a cross-sectional view of a valve in accordance with still another exemplary embodiment of the present disclosure with a spool in a first position.
Figure 15:
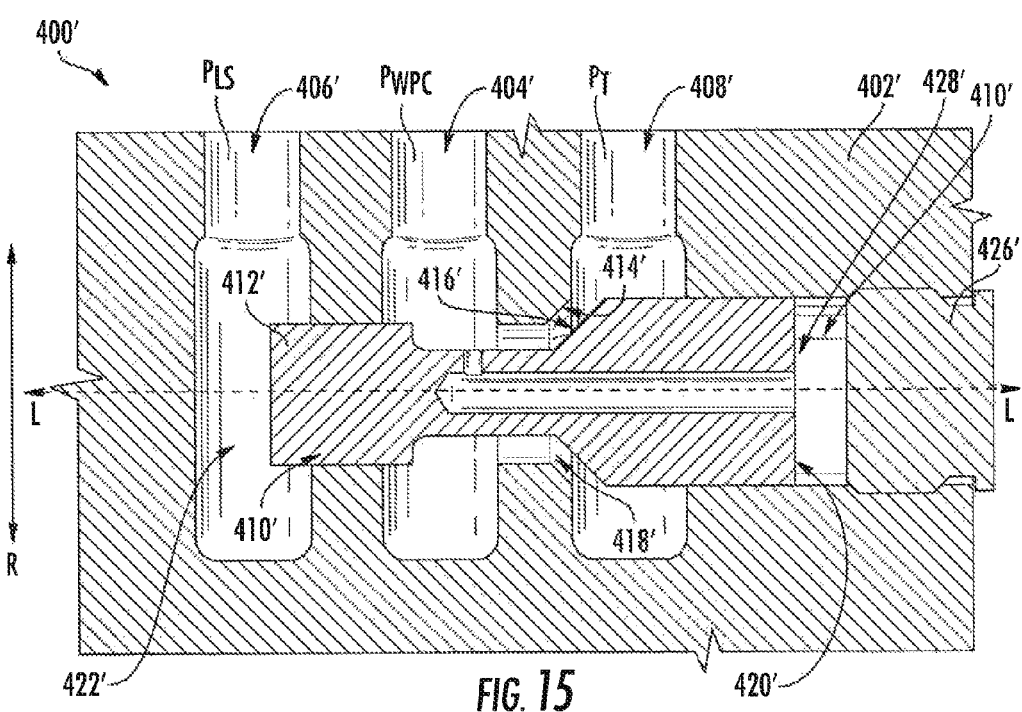
FIG. 15 provides a cross-sectional view of the exemplary valve of FIG. 14 with the spool in a second position.

Referring now to FIGS. 14 and 15, another exemplary embodiment of a valve 400' in accordance with the present disclosure is provided. The exemplary valve 400' of FIGS. 14 and 15 may be configured to operate in substantially the same manner as the valve 400 of FIGS. 12 and 13. Similar numbering in FIGS. 12 through 15 indicates the same or similar features.

The valve 400' of FIGS. 14 and 15, by contrast, however, is configured such that the work port channel 404' is positioned between the load sense channel 406' and the tank channel 408'. Accordingly, the work port bore 430' extends through a portion of the spool 412' positioned in the tank channel 408' to arrive at the work port chamber 428'.

Additionally, as is depicted, the tapered interface 418' instead tapers outwardly along a radial direction R from the longitudinal axis L towards the tank channel 408'.

It should be appreciated, however, that the exemplary valves 400, 400' of FIGS. 12 and 13 and FIGS. 14 and 15, respectively, are provided by way of example only. In certain exemplary embodiments, the valves may additionally be configured to provide protection from cavitation in, e.g., the hydraulic load 102, similar to the valves 142, 144, 200, and 300 described above with reference to FIGS. 8 through 11. Accordingly, in certain embodiments, the valves 400, 400' of FIGS. 12 and 13 and FIGS. 14 and 15 may additionally include a passage selectively fluidly connecting the load sense channel and the tank channel when a difference in the tank channel pressure $P_T$ and the load sense channel pressure $P_{LS}$ exceeds a predetermined threshold. Moreover, in such an exemplary embodiment, the passage may be, e.g., a bore defined in the spool 412, 412' or a cavity separate from the body cavity 410, 410', and the valve 400, 400' may further include a check valve positioned in the passage. For example, in certain embodiments, the valves 400, 400' of FIGS. 12 and 13, and FIGS. 14 and 15 may include the passage 242 and check valve 232 described above with reference to FIGS. 8 and 9, or alternatively may include the passage 342 with check valve 332 described above with reference to FIGS. 10 and 11.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A valve for a hydraulic system including a hydraulic load, a fluid storage vessel, a pressure source, a control valve, and a bypass line, the valve positioned in fluid communication with the bypass line and comprising:
   a work port channel configured for fluid connection with one of a first or second chamber of the hydraulic load;
   a load sense channel configured for fluid connection with a load sense line;
   a tank channel configured for fluid connection with the fluid storage vessel of the hydraulic system;
   a body cavity extending between the work port channel and the tank channel along a longitudinal axis, the body cavity defining an inner surface between the work port channel and the tank channel; and
   a spool movably positioned in the body cavity and defining an outer surface, the inner surface of the body cavity and the outer surface of the spool together defining an interface between the body cavity and the spool that extends outwardly from the longitudinal axis such that an increased pressure differential between the work port channel and the load sense channel increases a sealing force at the interface;
   wherein the inner surface of the body cavity is a tapered inner surface, wherein the outer surface of the spool is a tapered outer surface, and wherein the interface between the body cavity and the spool is a tapered interface.

2. The valve of claim 1, wherein the spool is movable between a first position and a second position within the body cavity, and wherein the interface prevents a flow of fluid between the tank channel and the work port channel when the spool is in the first position, and wherein the tapered interface allows for a flow of fluid between the tank channel and the work port channel when the spool is in the second position.

3. The valve of claim 2, wherein the spool is moved to the second position when the difference in a load sense pressure and a work port pressure exceeds a predetermined threshold.

4. The valve of claim 3, wherein the predetermined threshold is a ratio of the load sense pressure to the work port pressure.

5. The valve of claim 2, wherein the spool is biased toward the first position.

6. The valve of claim 2, wherein the tank channel is positioned between the load sense channel and the work port channel.

7. The valve of claim 2, wherein the work port channel is positioned between the load sense channel and the tank channel.

8. The valve of claim 1, wherein the spool defines a first longitudinal end, wherein the first longitudinal end and the body cavity define a work port cavity, and wherein the spool defines a bore fluidly connecting the work port channel to the work port cavity.

9. The valve of claim 1, wherein the spool defines a second longitudinal end exposed to the load sense channel pressure.

10. The valve of claim 1, wherein the body cavity further extends along the longitudinal axis to the load sense channel.

11. The valve of claim 1, wherein the spool defines a first longitudinal end and a second longitudinal end, wherein the first longitudinal end is exposed to the work port channel pressure and the second longitudinal end is exposed to the load sense channel pressure.

12. The valve of claim 11 wherein the first longitudinal end defines a first effective surface area, wherein the second longitudinal end defines a second effective surface area, and wherein the first effective surface area is greater than the second effective surface area such that the spool is biased towards a first position.

13. The valve of claim 11, further comprising a passage fluidly connecting the load sense channel and the tank channel when a difference in a tank channel pressure in the tank channel and the load sense pressure exceed a predetermined threshold.

14. The valve of claim 13, further comprising a check valve positioned in or adjacent to the passage.

15. The hydraulic system of claim 14, wherein the spool is movable between a first position and a second position within the body cavity, and wherein the interface prevents a flow of fluid between the tank channel and the work port channel when the spool is in the first position, and wherein the interface allows for a flow of fluid between the tank channel and the work port channel when the spool is in the second position.

16. The hydraulic system of claim 14, wherein the spool is moved to the second position when the difference in the load sense pressure and work port pressure exceeds a predetermined threshold.

17. The hydraulic system of claim 14, wherein the tank channel is positioned between the load sense channel and the work port channel.

18. The hydraulic system of claim 14, wherein the valve further defines a passage fluidly connecting the load sense channel and the tank channel when a difference in a tank channel pressure and the load sense pressure exceeds a predetermined threshold, and wherein the valve further comprises a check valve positioned in or adjacent to the passage.

19. The valve of claim 13, wherein the passage is a bore defined in the spool.

20. A hydraulic system comprising:
   a hydraulic load defining a first chamber and a second chamber;
   a fluid storage vessel;
   a pressure source;
   a control valve configured to fluidly connect the fluid storage vessel to one of the first and second chambers and to fluidly connect the pressure source to the other of the first and second chambers; and
   a bypass line defining a flow path between the fluid storage vessel and the hydraulic load that bypasses the control valve, the bypass line fluidly connected to a valve comprising
      a work port channel configured for fluid connection with one of the first or second chambers of the hydraulic load;
      a load sense channel configured for fluid connection with a load sense line;
      a tank channel configured for fluid connection with the fluid storage vessel of the hydraulic system;
      a body cavity extending between the work port channel and the tank channel along a longitudinal axis; the body cavity defining an inner surface between the work port channel and the tank channel; and
      a spool movably positioned in the body cavity and defining an outer surface, the inner surface of the body cavity and the outer surface of the spool together defining an interface between the body cavity and the spool that extends outwardly from the longitudinal axis such that an increased pressure differential between the work port channel and the load sense channel increases a sealing force at the interface;
   wherein the inner surface of the body cavity is a tapered inner surface, wherein the outer surface of the spool is a tapered outer surface, and wherein the interface between the body cavity and the spool is a tapered interface.

\* \* \* \* \*